United States Patent [19]

Koperdak

[11] Patent Number: 4,668,292
[45] Date of Patent: May 26, 1987

[54] VEHICLE TRACTION MATERIAL AND BAG THEREFOR

[75] Inventor: Edward A. Koperdak, Kalamazoo, Mich.

[73] Assignee: COPE, Inc., Schoolcraft, Mich.

[21] Appl. No.: 814,899

[22] Filed: Dec. 30, 1985

[51] Int. Cl.⁴ .................. C09K 3/14; H01L 43/00; B23K 1/00
[52] U.S. Cl. ...................... 106/36; 106/13; 228/14; 338/32 R
[58] Field of Search ............ 252/70; 106/13, 36; 238/14; 338/32

[56] References Cited

U.S. PATENT DOCUMENTS

| | | | |
|---|---|---|---|
| 2,308,289 | 1/1943 | Lawrence | 252/70 |
| 2,438,563 | 5/1948 | Kollmeyer | 238/14 |
| 3,490,744 | 1/1970 | Binsley | 252/70 |
| 4,108,669 | 8/1978 | Otrhalek et al. | 106/13 |
| 4,281,791 | 8/1981 | Schaaf et al. | 238/14 |
| 4,294,405 | 10/1981 | Ross | 238/14 |

FOREIGN PATENT DOCUMENTS 1459694 7/1971 Fed. Rep. of Germany ........ 252/70
073069 5/1982 Japan ..................... 252/70

Primary Examiner—Theodore Morris
Attorney, Agent, or Firm—Reising, Ethington, Barnard, Perry & Milton

[57] ABSTRACT

A vehicle traction material comprises a water scavenging agent such as an oxide, and a parting agent such as a stearate or oleate for keeping the material noncaking and free flowing. A relatively dense abrasive agent in either powdery or granular form imparts weight when carried in the vehicle and friction when spread under the vehicle tires. A nonchloride water-soluble melting agent from the group of compounds including nitrates, phosphates, sulfates and glycols liquefies ice and snow. The material is stored and carried in the vehicle by one or more bags (10) having an outer reinforced material (18) that is temperature, puncture and wear resistant and an inner lining (20) that is corrosion resistant and moisture proof. The bag is reinforced by gussets (16) and has a receivable closure (14) and handles (12), as well as stacking ribs (22) to allow several bags (10) of various sizes to be conveniently refilled, handled and stacked in a vehicle compartment.

7 Claims, 4 Drawing Figures

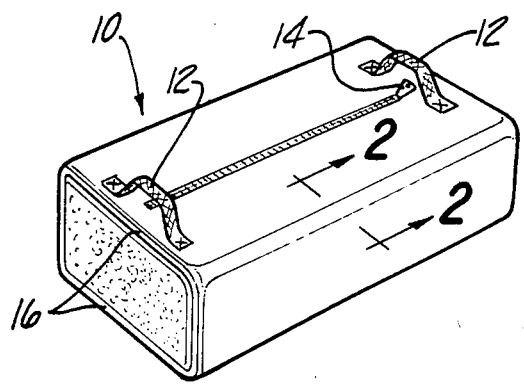
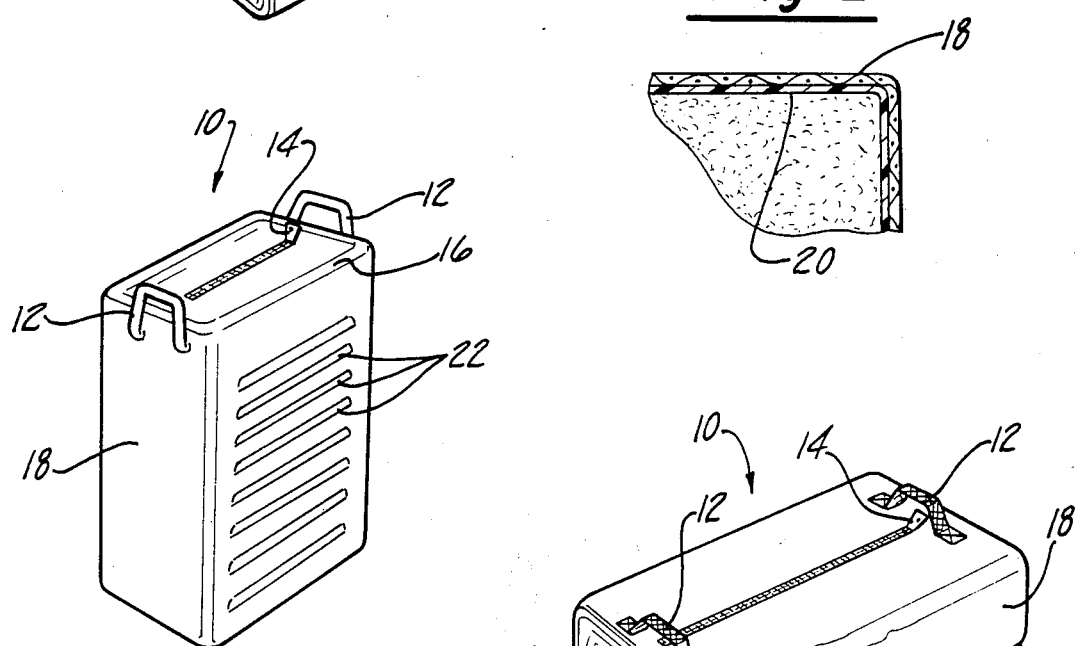
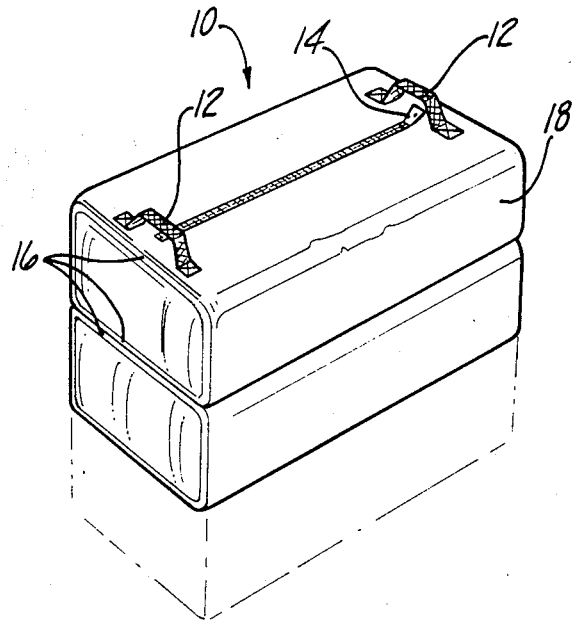

VEHICLE TRACTION MATERIAL AND BAG THEREFOR

TECHNICAL FIELD

The invention relates to containers and material therefor used to provide vehicle traction when carried and also when spread on the ground or road.

BACKGROUND OF THE INVENTION

Presently, chloride salts and sand or clay are chiefly used to melt ice and snow and provide traction, respectively, on a road, driveway, or the like, e.g. U.S. Pat. No. 4,108,669. Bag assemblies, called traction bags, for example, U.S. Pat. Nos. 4,294,405; 4,281,791 and 2,438,563, are also used wherein the traction bag either bursts or itself provides a frictional surface when placed under the tires of a vehicle. Not only on roadways and driveways, but where a vehicle has become immobilized with one or more tires spinning in ice or snow, does increased traction become necessary.

Chloride salts have been demonstrated to be destructive to vegetation and road surfaces, in addition to automobile body parts due to their corrosiveness. Sands have a tendency to not adhere to the road surface and cause hazardous slipping and sliding of vehicles thereover. Further, these traction materials are typically carried in the cargo compartment of the vehicle during the winter in case the vehicle becomes immobilized and also to act as a weight imparting means distributed over the drive axle of the vehicle for road stability. Heretofore, chloride salts and sand have been contained in paper bags which often burst in the vehicle causing their contents to spill in the compartment or, the bag becomes contaminated by moisture, causing the crystals to harden into a solid mass. The bags are not refillable and large bags, though more economical, are difficult to manipulate.

SUMMARY OF THE INVENTION AND ADVANTAGES

According to the invention, there is provided a vehicle traction material comprising a water scavenging agent and a parting agent for keeping the material non-caking and free-flowing, a relatively dense abrasive agent in either powdery or granular form to impart weight when carried in the vehicle and friction when spread under the vehicle tires and a nonchloride water-soluble melting agent from the group of compounds including nitrates, phosphates, sulfates and glycols. The material is mixed in a dry powdery or granular state and provides increased vehicle traction and road stability.

An advantage of the instant invention is a material that will melt or liquefy ice and snow, provide vehicle traction and be moisture-free and flowable and at the same time be nonhazardous to the environment, acting as a fertilizer for vegetation.

FIGURES IN THE DRAWINGS

Other advantages of the present invention will be readily appreciated as the same becomes better understood by reference to the following detailed description when considered in connection with the accompanying drawings wherein:

FIG. 1 is a perspective view of a bag of the invention;

FIG. 2 is a cross-section taken substantially along lines 2—2 of FIG. 1;

FIG. 3 is a perspective view of the invention showing several of the bags stacked on top of one another; and FIG. 4 is a perspective view of the invention showing the stacking means thereon.

DETAILED DESCRIPTION OF THE PREFERRED EMBODIMENTS

According to the invention, there is provided one or more stackable bags and a material therefor. The vehicle traction material comprises a water scavenging agent and a parting agent for keeping the material non-caking and free-flowing. A relatively dense abrasive agent in either powdery granular form, imparts weight to the material for road stability when carried in a vehicle. The abrasive agent also provides a frictional surface when dispensed from the bag and spread under the tires of the vehicle, resulting in increased vehicle traction. A nonchloride melting agent from the group of compounds including nitrates, phosphates, sulfates and glycols, liquefies ice and snow.

Referring to FIGS. 1 through 4, a compact reusable bag, generally shown at 10, is preferably made from a rubber or plastic polymer, although other natural or synthetic fibers could be used. The bag or container is designed so as to be easily handled, compact and moisture-proof, with good all-around resistance to heat, light (including ultraviolet light), ozone and extreme cold temperatures. The bag should also be resistant to tearing, puncturing, rupture and stretching.

The bag 10 has a collapsible, semi-rigid construction and is shaped to allow easy stacking upon another similar bag (FIG. 3). The bag 10 is provided with handles 12 and is compact to take up a minimal amount of space when stored in the trunk or baggage compartment of a vehicle. A zipper 14 or other closure means allows the bag to be opened and its contents spread on the road, then resealed. The bag may be refilled and used repeatedly. The bag 10 has support gussets 16, allowing the bag to retain its shape while strengthening the seams of the bag. The bag comprises an outer woven material 18 that may be a porous natural or synthetic fiber, for example, canvas or nylon and an inner lining 20 of moisture-proof material, for example, vinyl or polyethylene.

A problem with existing non-reusable salt or sand bags carried in vehicle trunks is the breaking and spilling of their contents within the vehicle; further, the bags themselves are often not of convenient weight for handling. For this purpose, the invention provides a series of ribs 22, enabling bags having convenient weights to be stacked on one another without shifting in the vehicle compartment. Since the bags are sturdy and will not burst, spillage of corrosive materials within the vehicle compartment is avoided and a much cleaner environment provided during storage. Furthermore, bags of different sizes are provided to accommodate the capabilities and preferences of each individual vehicle operator. The bag or container also is more aesthetically appealing, in addition to being more easily handled, when stored in the vehicle.

The material contained in the bag, as described above, includes melting, parting, scavenging and abrasive agents. The melting agent is nonhazardous and preferably from the group of nonchloride compounds including calcium nitrate, urea, ammonium nitrate, ammonium phosphate, ammonium sulfate, ethylene glycol and other glycols. The abrasive agent is from the group of compounds commonly known as limestones (calcium carbonate—200 Mesh), gravel or hard grit (Quincey 80-20), barium sulfate (coarse), fy ash (NIPCO), sand (coarse), hard rubber or other similar polymerics (dust). The parting agent is from the group of compounds including stearates, such as zinc stearate and calcium stearate; powdered waxes; various silicas, hydrated or fumed; oleates, such as ammonium oleate and zinc oleate; talcs, such as magnesium silicate; and cellulosic fibers. The scavenging agent is of the classes of compounds including oxides, particularly calcium oxide in agglomerated form (HARWICK DESICAL 85), or cellulosic fiber.

The material components can be mixed together in dry form or can be agglomerated in a ribbon blender or other similar equipment. In agglomerating the materials, an abrasive agent, being a gritty material, would form the center or seed of the agglomerate partile or micell, with the other ingredients evenly dispersed around the seed material. The seed material could be the gritty limestone gravel or polymeric grit. The partiles would be free-flowing and as the melting agent dissolves, the gritty material is exposed.

EXAMPLE A

| | | |
|---|---|---|
| 1. | Abrasive Agent Calcium Carbonate (gravel - 200 Mesh) | 60 parts or less |
| 2. | Melting Agent Calcium Nitrate or Ammonium Nitrate | 30 parts or less |
| 3. | Scavenging Agent Agglomerated Calcium Oxide (HARWICK DESICAL 85) | 1-5 parts |
| 4. | Parting Agent Zinc Stearate or Calcium Stearate | 1-15 parts |

EXAMPLE B

| | | |
|---|---|---|
| 1. | Abrasive Agent Fly ash (NIPCO) or Barium Sulfate (coarse) | 60 parts or less |
| 2. | Melting Agent Ammonium Phosphate or Ammomium Sulfate | 30 parts or less |
| 3. | Scavenging Agent Agglomerated Calcium Oxide (HARWICK DESICAL 85) | 1-5 parts |
| 4. | Parting Agent Ammonium Oleate or Zinc Oleate | 1-15 parts |

EXAMPLE C

| | | |
|---|---|---|
| 1. | Abrasive Agent Hard rubber or polymeric (dust) | 60 parts or more |
| 2. | Melting Agent Ethylene Glycol | 30 parts or less |
| 3. | Scavenging Agent Cellulosic Fiber or Agglomerated Calcium Oxide (HARWICK DESICAL 85) | 1-5 parts |
| 4. | Parting Agent Powdered wax or | 1-15 parts |

-continued

| | |
|---|---|
| | Magnesium Silicate (talc) |

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A vehicle traction material comprising: a water scavenging agent; a parting agent for keeping the material noncaking and free-flowing; a relatively dense abrasive agent in either powdery or granular form, imparting weight for road stability when carried in the vehicle and friction when spread under the tires thereof, resulting in increased vehicle traction; and a nonchloride melting agent selected from the group consisting essentially of compounds including nitrates, urea, phosphates, sulfates and glycols, said material being mixed in dry powdery or granular state, said water scavenging agent selected from the group consisting essentially of compounds including oxides and cellulosic fibers, said water scavenging agent including calcium oxide either in powder or agglomerated form.

2. A vehicle traction material as set forth in claim 1 further characterized by said abrasive agent selected from the group consisting essentially of compounds commonly known as limestones, gravel or hard grit, barium sulfate, sand, fly ash or hard polymeric materials.

3. A vehicle traction material as set forth in claim 2 further characterized by said parting agent selected from the group consisting essentially of compounds including stearates, powdered waxes, oleates, talcs, cellulosic fibers and hydrated or fumed silicas.

4. A vehicle traction material as set forth in claim 1 further characterized by said melting agent from the group consisting essentially of compounds including nitrates, sulfates or phosphates of ammonium.

5. A vehicle traction material as set forth in claim 1 further characterized by said traction material being agglomerated with said melting, water scavenging and parting agents evenly dispersed in partiles or micells about a central or seed material composed of said abrasive agent.

6. A vehicle traction material as set forth in claim 1 further characterized by said traction material being contained in a closable reinforced rectangular bag (10) having an outer layer (18) resistant to breakage, temperature and light and an inner layer (20) resistant also to moisture and corrosion, for stable storage of said material during carriage in the vehicle.

7. A vehicle traction material as set forth in claim 6 further characterized by each of said bags (10) including stacking means (22) for stacking a plurality of said bags securely against one another and one or more handles (12) for filling and carrying said bags (10) securely into the cargo compartment of a vehicle.

* * * * *